United States Patent [19]

Sekmakas

[11] Patent Number: 4,839,403
[45] Date of Patent: Jun. 13, 1989

[54] CROSS-LINKED EMULSION COPOLYMERS IN THERMOSETTING AQUEOUS COATINGS

[75] Inventor: Kazys Sekmakas, Des Plaines, Ill.

[73] Assignee: DeSoto, Inc., Des Plaines, Ill.

[21] Appl. No.: 78,640

[22] Filed: Jul. 28, 1987

[51] Int. Cl.$^4$ .................. C08K 05/04; C08L 33/10; C08L 33/12; C08L 33/26
[52] U.S. Cl. .................. 523/412; 523/411; 524/513; 524/522; 524/523; 525/113
[58] Field of Search .................. 525/113; 523/412; 524/522, 523, 513

[56] References Cited

U.S. PATENT DOCUMENTS

| | | | |
|---|---|---|---|
| 31,936 | 7/1885 | Sperry et al. | 524/522 |
| 4,126,595 | 11/1978 | Martorano et al. | 524/522 |
| 4,246,089 | 1/1981 | Hazan | 525/113 |
| 4,290,932 | 9/1981 | Wright et al. | 524/522 |
| 4,337,187 | 6/1982 | Hazan | 525/113 |
| 4,365,043 | 12/1982 | Konishi et al. | 525/113 |
| 4,377,661 | 3/1983 | Wright et al. | 524/522 |
| 4,390,658 | 6/1983 | Graetz et al. | 524/512 |
| 4,510,275 | 4/1985 | Ihikura et al. | 524/513 |
| 4,522,962 | 6/1985 | Abbey et al. | 525/117 |
| 4,624,973 | 11/1986 | Kuwajima et al. | 524/513 |
| 4,731,409 | 3/1988 | Miwa et al. | 524/522 |

FOREIGN PATENT DOCUMENTS

| | | | |
|---|---|---|---|
| 0188689 | 7/1986 | European Pat. Off. | 523/412 |
| 1182521 | 2/1970 | United Kingdom | 525/113 |

*Primary Examiner*—John C. Bleutge
*Assistant Examiner*—Robert E. L. Sellers, II
*Attorney, Agent, or Firm*—Dressler, Goldsmith, Shore, Sutker, & Milnamow, Ltd.

[57] ABSTRACT

Aqueous thermosetting coating compositions are disclosed in which water has dispersed therein: (1) an acidic hydroxy-functional resin dispersed in water as a salt with a volatile base; (2) a curing agent reactable with the hydroxy groups of the hydroxy-functional resin to cure the same, this curing agent being dispersed in the aqueous medium containing said component (1); and (3) an aqueous emulsion of cross-linked emulsion copolymer comprising, by weight: (A) from 2% to 20% of polyethylenically unsaturated monomer; (B) from 3% to 30% of hydroxy-functional monoethylenically unsaturated monomer (C) from 0% to 20% of monoethylenically unsaturated carboxylic acid monomer; and (D) the balance of the copolymer consisting essentially of copolymerizable nonreactive monoethylenically unsaturated monomer. The emulsion is used to provide the emulsion copolymer in an amount of from 10% to 80% of the total weight of resinous material.

13 Claims, No Drawings

CROSS-LINKED EMULSION COPOLYMERS IN THERMOSETTING AQUEOUS COATINGS

TECHNICAL FIELD

This invention relates to thermosetting aqueous coatings containing cross-linked emulsion copolymers to enhance the cure and properties of the cured coatings.

BACKGROUND OF INVENTION

Aqueous thermosetting coatings containing neutralized acid-functional resins in combination with a water dispersible curing agent, such as hexamethoxymethyl melamine, are known. It is desired to improve the mar resistance, surface hardness, corrosion resistance, adhesion to metal substrates and solvent resistance of such coatings.

DISCLOSURE OF INVENTION

In accordance with this invention, an aqueous thermosetting coating composition comprises water having dispersed therein: (1) an acidic hydroxy-functional resin dispersed in water as a salt with a volatile base; (2) a curing agent reactable with the hydroxy groups of said hydroxy-functional resin to cure the same, said curing agent being dispersed in the aqueous medium containing said component (1); and (3) an aqueous emulsion of cross-linked emulsion copolymer comprising, by weight: (A) from 2% to 20% of polyethylenically unsaturated monomer; (B) from 3% to 30% of hydroxy-functional monoethylenically unsaturated monomer; (C) from 0% to 20% of monoethylenically unsaturated carboxylic acid monomer; and (D) the balance of the copolymer consisting essentially of copolymerizable nonreactive monoethylenically unsaturated monomer, said emulsion copolymer being present in an amount of from 10% to 80% of the total weight of resinous material.

The above proportions are based on the weight of the copolymer, and the term "nonreactive" identifies monoethylenic monomers in which the single ethylenic group is the only group reactive under the normal conditions of polymerization and subsequent cure.

The emulsion copolymerization is carried out in water in the presence of surfactant and the process is itself conventional. The resulting aqueous emulsion is employed in an amount such that the emulsion copolymer is present in an amount providing from 10% to 80%, preferably from 20% to 70%, of the total weight of resin solids in the coating composition.

It is found that when the aqueous dispersion containing the cross-linked emulsion copolymer is deposited upon a substrate, the acidic hydroxy-functional resin which is in solution in the aqueous phase as a salt with a volatile base functions to provide a matrix in which the emulsion copolymer particles are dispersed, and on subsequent baking the dispersed curing agent is able to react with the hydroxy functionality in both the emulsion copolymer and the water-dispersed resin to unite the dispersed resin and the emulsified resin particles into a continuous film having remarkable properties. In the absence of the dispersed resin, the aqueous emulsions of this invention form nonhomogeneous and poorly cured films when spread upon a substrate and baked.

While the cross-linked emulsion copolymer may be a conventional one made using polyacrylates and polymethacrylates, care should be taken to avoid complete insolubilization of the copolymer. Accordingly, more than 20% of the polyethylenically unsaturated monomer should be avoided. Moreover, when the polyethylenic monomer contains more than two ethylenic groups, its proportion should be further minimized to allow the copolymer to form a homogeneous film upon baking. Still further, cross-linked emulsion copolymers of special character appear to provide a copolymer molecule in which the hydroxy groups are more available for the purpose of forming a homogeneous film which is the objective in this invention. The homogeneity of the film is demonstrated by the clarity of the film. Thus, diethylenically unsaturated monomers, and especially dimaleates or difumarates are particularly effective in providing preferred cross-linked copolymers.

The result is an aqueous coating composition which can be smoothly and uniformly applied and which cures using a reasonable baking schedule (20 minutes in a 375° F. oven being used as illustrative). The cured films are characterized by superior chemical and physical characteristics as the result of the presence of the high molecular weight cross-linked emulsion copolymer which normally finds little utility in aqueous coating compositions.

The acidic hydroxy-functional resin which is dispersed in water as a salt with a volatile base is itself well known and is usually employed in an amount to constitute from 5% to 70% of the composition, preferably from 10% to 40%. The resins which may be used embrace acrylic copolymers including copolymerized hydroxy-functional monoethylenic monomers and copolymerized carboxyl-functional monoethylenic monomers. Typical proportions are from 5% from 35% hydroxy monomer, like 2-hydroxyethyl acrylate or methacrylate, from 1% to 20% carboxyl-functional monomer, like acrylic acid or methacrylic acid, and the balance is normally nonreactive monomer, like styrene, methyl methacrylate, vinyl acetate, acrylonitrile, ethyl acrylate, butyl acrylate, and the like. The term "nonreactive" indicates the absence of any group reactive under normal curing conditions other than the single ethylenic group.

Polyesters of low molecular weight which possess an hydroxyl number in excess of 50, preferably in excess of 100, because they are made with an excess of polyol, and which retain carboxyl functionality because they are not completely reacted, are also useful herein. Polyesters of this type which are dispersible in water by salt formation with a volatile base are well known.

It is particularly preferred to employ, as the hydroxy-functional resin, an oxirane-free epoxy-phosphate comprises the reaction product of a resinous polyepoxide with othophosphoric acid (pyrophosphoric acid is considered an equivalent because it generates orthophosphoric acid) in an organic solvent solution. Only one of the hydroxyl groups of the phosphoric acid appears to react, and based on that stoichiometry, excess 1,2-oxirane functionality is present in the polyepoxide to provide an epoxy-functional epoxy-phosphate. The organic solvent is preferably a water miscible, alcoholic solvent, and 2-ethoxyethanol and 2-butoxyethanol are preferred. In one embodiment, more than 75 percent of the organic solvent is 2-ethyoxyethanol.

Any organic solvent-soluble resinous polyepoxide may be used herein. By a polyepoxide is meant an epoxide having a 1,2-epoxy equivalence of at least about 1.2. Diepoxides are preferred, especially diglycidyl ethers of bisphenols having a 1,2-epoxy equivalence in the range of 1.3–2.0. The class of bisphenols is well known, and bisphenol A is usually used in commerce. Diglycidyl ethers of bisphenol A are commonly available in commerce and such commercial materials may be used herein. It is preferred to employ those bishpenols having an average molecular weight (by calculation) of from about 500, more preferably at least about 800, up to about 5000. Epon 1004 from Shell Chemical Company, Houston, TX is described herein as illustrative. Epon 1007 (also available from Shell) further illustrates suitable polyepoxides, and is preferred.

The term "a bisphenol" is known to describe compounds of the formula:

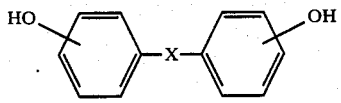

in which X is a straight chain or branched chain divalent aliphatic radical of from 1 to 3 carbon atoms, of

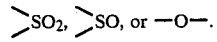

The preferred bisphenol is bisphenol A (or 4, 4'-isopropylidenediphenol) in which X is 2,2-propylidene and the two hydroxyl groups are in the para position. Other suitable bisphenols include 4,4'-thiodiphenol and 4,4'-sulfonyldiphenol.

A preferred embodiment of the invention will be described using a preferred diglycidyl ether of bisphenol A having a number average molecular weight of about 4500.

It is desired to point out that this invention reacts a polyepoxide with a stoichiometric deficiency of orthophosphoric acid based on the formation of an ester with only one of the three hydroxyl groups in the phosphoric acid (a monoester). Several points should be appreciated with respect to this monoester formation.

First, one of the three hydroxyl groups in orthophosphoric acid is much more reactive than the other two. It is well known that, as a result, under moderate reaction conditions, the reaction proceeds smoothly to cause monoester formation with all of the phosphoric acid without any significant involvement of the other two hydroxyl groups. All that is needed for this purpose is to heat the orthophosphoric acid (typically available as an 85 percent solution in water) with the epoxy resin in organic solvent solution at about 125 degrees C. The formation of the monoester is itself well known.

It is not necessary that all of the stoichiometric deficiency of acid be orthophosphoric acid so long as at least 0.05 mol of orthophosphoric acid is used for each oxirane equivalent in the polyepoxide. Carboxylic acids, such as acetic acid or dimethylolpropionic acid, may be used in place of a portion of the orthophosphoric acid. At least about 10 percent, preferably from about 30 percent to 80 percent, of the initial oxirane groups should not be reacted with phosphoric acid to minimize the acid content of the cured film.

It is appropriate to use the phosphoric acid in an amount such that the epoxy-phosphate contains from 0.05 mol to 0.9 mol of phosphoric acid per epoxide equivalent in the polyepoxide, which is preferably a diglycidyl ether as noted above. It is preferred to employ from 0.1 to 0.4 mol of orthophosphoric acid per epoxide equivalent in the polyepoxide.

It is desirable to minimize the proportion of phosphoric acid in order to provide the best resistance to chemical attack in the final cured coatings. Enough phosphoric acid should be used, however, to provide the desired curing catalysis.

It is the unreacted P-OH groups which are relied upon to provide dispersibility in water with the aid of a volatile amine. The reaction with phosphoric acid leaves some of the epoxy groups unreacted. These unreacted epoxy groups may be consumed in the presence of amines, hydrolyzed with water, esterified with monocarboxylic acids such as acetic acid or esterified with alcohols such as n-butanol, but they must be removed. Hydrolysis with water is particularly preferred. These unreacted epoxy groups lead to instability in the aqueous dispersions which are formed.

The volatile amines which are used herein are well known. Dimethylethanol amine is preferred and will be used herein as illustrative, but many other amines are also useful. Thus, other amines, such as triethyl amine, and mono-, di-, or triethanol amine are all useful. Ammonia is commonly considered a volatile amine for the purpose at hand, but it is less preferred because its use produces lower solids content and requires a greater proportion of water miscible organic solvent.

The curing agents which are dispersed in the aqueous dispersions under consideration are preferably methylol-functional curing agents, but blocked polyisocyanate curing agents are well known for use in curing hydroxyl-functional polymers in aqueous medium and are also useful.

The preferred methylol-functional curing agents are also well known and are illustrated by water soluble and dispersible aminoplast and phenoplast resins. These may be water soluble, like hexamethoxymethyl melamine, which is preferred, and also by A-stage resols. All of these curing agents are well known and their use will be further illustrated in the examples. These curing agents are used in an amount of from about 5% to about 45%, preferably from 10% to 35%. Proportions of from about 10% to 25% are best since the high molecular weight and cross-linked character of the emulsion copolymer minimize the need for further cross-linking.

The cross-linked emulsion copolymers which are used herein are hydroxyl-functional materials, as indicated by an hydroxyl value of from about 50 to about 300, preferably from 75 to 200. These copolymers are made in conventional fashion by polymerizing the monomers, which are predominantly monoethylenically unsaturated, in aqueous emulsion using the usual emulsifying agents. Anionic surfactants are preferred for use herein to obtain fine particle size and to maximize compatibility in the aqueous alkaline medium which is normally present.

The hydroxyl functionality may be contributed by either using an hydroxyl-functional monoethylenically unsaturated monomer, like 2-hydroxyethyl acrylate or methacryalte, or by using a polyethylenic monomer having hydroxyl functionality, or preferably by using both.

Referring more particularly to the hydroxy-functional monoethylenically unsaturated monomer, various monomers are readily available in this category, hydroxyethyl acrylate and hydroxyethyl methacrylate being illustrative. One may also use the corresponding hydroxypropyl and hydroxybutyl acrylates and methacrylates. Hydroxypropyl methacrylate is presently preferred and will be used as illustrative. Monohydric monomers are preferred, but one could use the monoacrylate of glycerin.

The hydroxy monomer provides the copolymer particles with a degree of hydrophilicity as well as reactive sites for subsequent cure with an appropriate curing agent, and is preferably present in an amount of from 5% to 20%.

While it is preferred to have the hydroxy monomer as the main reactive monomer, except for an acid monomer, it is possible to include small proportions of other reactive, groups, especially the N-methylol group, particularly after said group has been etherified with an alcohol, like butanol, to minimize premature reaction. Butoxymethyl acrylamide will illustrate the other reactive monomers which may be used.

While the polyethylenically unsaturated monomer can vary considerably, diethylenically unsaturated monomers are particularly contemplated to constitute the bulk of this component. It is preferred to employ a polyethylenically unsaturated monomer which is a dimaleate or difurmarate of a trihydric alcohol, preferably glycerin. The preferred polyethylenically unsaturated monomer is the ester reaction product of glycerin with two molar proportions of a $C_1$–$C_{18}$ monoalkyl maleate, preferably monobutyl maleate. Other polyethylenically unsaturated monomers which may be used are preferably diethylenic, and are illustrated by 1,6-hexane diol diacrylate, 1,4-butane diol diacrylate, glyceryl diacrylate, butylene glycol diallyl ether, glyceryl diallyl ether, divinyl benzene, and trimethylol propane diallyl ether. The corresponding methacrylate esters and methallyl ethers are also useful. It is stressed, however, that emulsion copolymers containing polyethylenically unsaturated monomers are themselves known, albeit these have been previously used in solvent dispersions, and not as an emulsion in an aqueous thermosetting coating.

The polyethylenically unsaturated monomers are preferably diethylenically unsaturated and used in an amount of from 5% to 15% in order to enhance the mechanical properties of the final coating without impairing the continuity of the film which is produced on baking.

The nonreactive monomers are subject to wide variation and should constitute more than 50% of the copolymer. These are illustrated by $C_1$–$C_{10}$ esters of acrylic and methacrylic acids, styrene, vinyl toluene, acrylonitrile and vinyl acetate. These monomers can be selected and balanced to provide the hardness which is desired in any particular type of coating, as is common practice in the production of copolymers for coating utility.

It is preferred to include in the copolymer the previously noted small proportion of monoethylenically unsaturated carboxylic acid for this is helpful in the aqueous alkaline medium which is employed. Nonetheless, the presence of any reactive monomer other than the hydroxy monomer used for cure is not essential.

It is desired to point out that emulsion copolymers including substantial hydroxyl functionality are themselves well known, but these are not useful herein in the absence of the polyethylenic cross-linking agent. This will be demonstrated in the Examples which follow where the illustration of this invention is reproduced using an emulsion copolymer like that used in Example 1 but in which the polyethylenic cross-linking agent is replaced by additional ethyl acrylate. In these Examples, all parts are by weight.

EXAMPLE 1

1280 parts of deionized water together with 10 parts an anionic surfactant (Aerosol 501) are charged to a reactor and heated to 80° C.

There are separately premixed 143 parts of deionized water and 8 parts of ammonium persulfate to provide a catalyst solution. 10 parts of this catalyst solution are then added to the reactor at 80° C. The balance of the catalyst solution is added slowly at the same time that the monomer preemulsion to be described is added.

A monomer preemulsion is formed by mixing 1080 parts of deionized water, 20 parts of Aerosol 501, 192.66 parts of styrene, 300.46 parts of ether acrylate, 53.27 parts of hydroxypropyl methacrylate, 60.71 parts of the reaction product of 2 moles of monobutyl maleate with one mole of glycerin, 12.4 parts of acrylic acid, and 4 parts of a 70% water solution of tertiary-butyl-hydroperoxide. This preemulsion is slowly added to the reactor while the balance of the catalyst premix is simultaneously added.

The simultaneous addition is carried out over a four hour period during which the temperature in the reactor is maintained at 85° C. After addition is complete, a final catalyst mixture is added over 40 minutes (0.8 parts of ammonium persulfate in 15 parts of deionized water, and when this addition is complete, the reactor is allowed to cool to 30° C. The product was a milky latex.

EXAMPLE 2

355 grams of 2-butoxy ethanol are mixed with 24 grams of 85% orthophosphoric acid and 40 grams of deionized water are placed in a 50 liter flask equipped with a reflux condenser and heated, with agitation, to 105° C. Then 914 grams of a diglycidyl ether of bisphenol A having an average molecular weight of 4500 (the Shell product Epon 1007 may be used) are slowly added. The added material is a solid and is added as flakes over a period of 30 minutes while maintaining the 105° C. temperature. In this way the orthophosphoric acid reacts with some of the oxirane groups in the diglycidyl ether, and many of the oxirane groups are hydrolyzed as the reaction proceeds, thus minimizing the proportion of unreacted oxirane groups in the reactor. The reaction mixture is maintained at 105° C. for 2 hours to insure completion of the esterification and hydrolysis reactions, and then the reaction mixture is cooled to 80° C.

50 grams of dimethyl ethanol amine are separately mixed ito 100 grams of deionized water and this mixture is then added to the reactor over a period of 15 minutes and the reaction mixture is then held at 80° C. for 30 minutes. This completes the hydrolysis reaction and neutralize enough of the unreacted acidity of the phosphoric acid (which is essentially monofunctional in the reaction with oxirane) to enable dispersion in water in the presence of the large amount of 2-butoxy ethanol present.

Coatings are prepared by utilizing anionic dimaleate crosslinked emulsion, aqueous epoxy-phosphate dispersion and water dispersible aminoplast curing agent. The desired properties which are imparted by dimaleate emulsion are: improved hardness, adhesion to metal, better corrosion resistance and improved solvent resistance.

EXAMPLE 3

An aqueous thermosetting coating was prepared having the following proportions based on total weight of resin solids:

| Component | Solids Proportion |
|---|---|
| Dimaleate emulsion, as described in Example 1 | 60% |
| Epoxy phosphate aqueous dispersion, as described in Example 2 | 20% |
| Hexamethoxymethyl melamine (100% solids) | 20% |
| | 100% |

The aqueous polymer dispersions were blended as shown below:

| Component | Solids Proportion |
|---|---|
| 300 g. Dimaleate emulsion (20% polymer solids) | 60 g. |
| 70 g. Epoxy phosphate dispersion (28.6% polymer solids) | 20 g. |
| 20 g. Hexamethoxy methyl melamine (100% solids) | 20 g. |
| | 100 g. |

The hexamethoxymethyl melamine (the American Cyanamid product Cymel 301 may be used) is incorporated by mixing it into the neutralized reaction mixture of Example 2 at 70° C. and agitating for 30 minutes to insure an intimate blending of this aminoplast curing agent with the epoxy phosphate product. Deionized water is then added over a period of 90 minutes with rapid agitation to produce a milky dispersion having a solids content of 29.9%.

The dimaleate copolymer aqueous emulsion is incorporated by simply mixing the emulsion into the above aqueous mixture of epoxy phosphate and aminoplast resin with agitation.

A draw-down was made on zinc phosphate pretreated steel panels. The coating was cured in an electric oven for 20 minutes at 375° F. A glossy, hard, flexible coating was obtained which had the following characteristics:

| | |
|---|---|
| Film thickness | 0.6 mil. |
| Pencil hardness | 2H-3H |
| Direct impact | 80 inch/lb. |
| Flexibility ($\frac{1}{4}$" mandrel) | Pass |
| Loss of adhesion after bending | None |
| Resistance to 100 MEK rubs | Excellent |

These are remarkable properties to be achieved by a simple baked on aqueous coating, and are far better than are provided in the absence of the dimaleate copolymer aqueous emulsion. The epoxy phosphate component provides superior corrosion resistance as well as other desired characteristics.

EXAMPLE 4

The crosslinked emulsion polymer of Example 1 was reproduced, only 9.8% of the dimaleate crosslinker was replaced with a corresponding weight of ethyl acrylate. Coatings formulated with the Example 4 emulsion as described in Example 3 failed 10 MEK rubs (methyl ethyl ketone solvent), indicating that the film was soft and very solvent sensitive due to the absence of the crosslinking monomer.

Example 3 was repeated except the epoxy phosphate component was omitted. The aqueous composition without the epoxy phosphate did not form a continuous coating when drawn down on the described panels, and the result was useless.

What is claimed is:

1. An aqueous thermosetting coating composition comprising water having dispersed therein: (1) an oxirane-free epoxy phosphate dispersed in water as a salt with a volatile base; (2) a methylol-functional curing agent reactable with the hydroxy groups of said epoxy phosphate to cure the same, said curing agent being dispersed in the aqueous medium containing said component (1) in an amount of at least about 5% of the total weight of resinous material; and (3) an aqueous emulsion of cross-linked emulsion copolymer of copolymerized ethylenically unsaturated monomers comprising, by weight: (A) from 2% to 20% of polyethylenically unsaturated monomer; (B) from 3% to 30% of hydroxy-functional monoethylenically unsaturated monomer; (C) from 0% to 20% of monoethylenically unsaturated carboxylic acid monomer; and (D) the balance of the copolymer consisting essentially of copolymerizable nonreactive monoethylenically unsaturated monomer, said emulsion copolymer being present in an amount of from 10% to 80% of the total weight of resinous material.

2. An aqueous thermosetting coating composition as recited in claim 1 in which said copolymer is present in an amount of from 20% to 70% of the total weight of resinous material.

3. An aqueous thermosetting coating composition as recited in claim 1 in which said curing agent is used in an amount of from about 5% to about 45% of the total weight of resinous material.

4. An aqueous thermosetting coating composition as recited in claim 1 in which said curing agent is an aminoplast resin used in an amount of from 10% to 35% of the total weight of resinous material.

5. An aqueous thermosetting coating composition as recited in claim 4 in which said curing agent is hexamethoxymethyl melamine used in an amount of from 10% to 25% of the total weight of resinous material.

6. An aqueous thermosetting coating composition as recited in claim 1 in which said emulsion copolymer is formed by copolymerization in aqueous emulsion in the presence of an anionic surfactant.

7. An aqueous thermosetting coating composition as recited in claim 1 in which said copolymer contains from 1.0% to 10% of said monoethylenically unsaturated carboxylic acid and more than 50% of said nonreactive monomer, and said polyethylenically unsaturated monomer consists essentially of diethylenically unsaturated monomer present in an amount of at least 5%.

8. An aqeuous thermosetting coating composition as recited in claim 7 in which said diethylenically unsaturated monomer is a dimaleate or difumarate.

9. An aqueous thermosetting coating composition as recited in claim 1 in which said polyethylenically unsaturated monomer is the reaction product of 2 moles of monobutyl maleate with one mole of glycerin and is present in said copolymer in an amount of from 5% to 20%.

10. An aqueous thermosetting coating composition as recited in claim 1 in which said oxirane-free epoxy phosphate is the reaction product of a diglycidyl ether of a bisphenol having a molecular weight of from about 500 to about 5000 with from 0.1 to 0.4 mole of orthophosphoric acid per epoxide equivalent, the balance of the epoxy groups of said diglycidyl ether being hydrolyzed with water.

11. An aqueous thermosetting coating composition comprising water having dispersed therein: (1) an oxirane-free epoxy phosphate dispersed in water as a salt with a volatile base; (2) a methylol-functional curing agent reactable with the hydroxy groups of said epoxy phosphate to cure the same, said curing agent being dispersed in the aqueous medium containing said component (1) in an amount of at least about 5% of the total weight of resinous material; and (3) an aqueous emulsion of cross-linked emulsion copolymer of copolymerized ethylenically unsaturated monomers comprising, by weight: (A) from 2% to 20% of polyethylenically unsaturated monomer; (B) from 3% to 30% of hydroxy-functional monoethylenically unsaturated monomer; (C) from 0% to 20% of monoethylenically unsaturated carboxylic acid monomer; and (D) the balance of the copolymer consisting essentially of copolymerizable nonreactive monoethylenically unsaturated monomer, said dispersed resin being present in an amount of from 5% to 70% of the total weight of resinous material and said emulsion copolymer being present in an amount of from 10% to 80% of the total weight of resinous material.

12. An aqueous thermosetting coating composition as recited in claim 11 in which said copolymer is present in an amount of from 20% to 70%, said curing agent is an aminoplast resin present in an amount of 5% to 45%, and said dispersed resin is present in an amount of from 10% to 40%.

13. An aqueous thermosetting coating composition as recited in claim 1 in which said aqueous coating composition forms a nonhomogeneous and poorly cured film when spread upon a substrate and baked in the absence of said salt-dispersed resin.

* * * * *

UNITED STATES PATENT AND TRADEMARK OFFICE
CERTIFICATE OF CORRECTION

PATENT NO. : 4,839,403

DATED : June 13, 1989

INVENTOR(S) : Kazys Sekmakas

It is certified that error appears in the above-identified patent and that said Letters Patent is hereby corrected as shown below:

Col. 2, line 33, "from" second usage should be --to--.
Col. 6, line 36, "50" should be --5--.

Signed and Sealed this

Seventeenth Day of July, 1990

Attest:

HARRY F. MANBECK, JR.

Attesting Officer

Commissioner of Patents and Trademarks